United States Patent
Genduso et al.

(10) Patent No.: US 6,442,648 B1
(45) Date of Patent: Aug. 27, 2002

(54) METHOD OF AND SYSTEM FOR THE DYNAMIC SCHEDULING OF REQUESTS TO ACCESS A STORAGE SYSTEM

(75) Inventors: Thomas B. Genduso, Apex; Donald Ingerman, Raleigh, both of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/277,695

(22) Filed: Mar. 26, 1999

Related U.S. Application Data (63) Continuation-in-part of application No. 09/148,181, filed on Sep. 3, 1998.

(51) Int. Cl.$^7$ .............................................. G06F 12/00

(52) U.S. Cl. ....................................... 711/112; 711/158

(58) Field of Search ................................. 711/111, 151, 711/158, 167, 112, 113, 4

(56) References Cited

U.S. PATENT DOCUMENTS

| | | | |
|---|---|---|---|
| 5,729,718 A | * | 3/1998 | Au ............................... 360/48 |
| 5,737,547 A | * | 4/1998 | Zuravleff et al. ............ 710/112 |
| 5,829,046 A | * | 10/1998 | Tzelnic et al. ............... 711/100 |

* cited by examiner

*Primary Examiner*—Matthew Kim
*Assistant Examiner*—Matthew D. Anderson
(74) *Attorney, Agent, or Firm*—Andrew J. Dillon (57) ABSTRACT

A method and system in a data processing system for dynamically scheduling the processing of a plurality of requests to access a disk, in which each of the plurality of requests is associated with a location on the disk, processes the requests in a first sequential order and determines the amount of time necessary to process a selected number of requests associated with locations between the current location on the disk and the most urgent request. At a time that is earlier than the deadline for processing the most urgent request by the amount of time necessary to process the selected number of requests, the method commences processing of the selected number of requests in a second sequential order.

28 Claims, 8 Drawing Sheets

METHOD OF AND SYSTEM FOR THE DYNAMIC SCHEDULING OF REQUESTS TO ACCESS A STORAGE SYSTEM

CROSS-REFERENCE TO RELATED APPLICATION

The present application is a Continuation-in-part of co-pending application Ser. No. 09/148,181, filed Sep. 3, 1998, the disclosure of which is incorporated herein by reference.

BACKGROUND OF THE INVENTION

1. Technical Field

The present invention relates to data processing systems, and in particular to a method and system in a data processing system for dynamically scheduling a plurality of requests which include real-time and non-real-time requests.

2. Description of the Related Art:

Devices in a data processing system, such as disk drive adapters, are usually connected via a bus to transmit data from one device to and from other system resources, such as the central processor and memory. Each of these devices has data that it normally transfers. For example, one device may normally transfer real-time data such as is necessary to display a multimedia presentation. A second device may normally transfer non-real-time data that may be a file transfer. A third device may transfer both real-time and non-real-time data. The data transferred by these devices may be stored in a disk drive.

Real-time data is data that has an associated deadline. The deadline defines the time by which the real-time data must be transferred. Failure to transfer real-time data prior to the associated deadline will result in lost data. Non-real-time data has no associated deadline.

A computer system needs to support the transfer of both real-time and non-real-time data simultaneously. Often, however, when both real-time and non-real-time data are supported simultaneously, real-time data is not transferred in a timely manner without adversely affecting non-real-time data transfer. Since many of the data transfers come from disks, effective, efficient disk scheduling is important to provide timely delivery of data.

Modern disk storage systems use scheduling algorithms to order requests to minimize the amount of seeking, i.e. physical arm movement, a disk must do in order to locate the requested data. One such algorithm is called the elevator or SCAN algorithm. Each data request has an associated track on the physical disk on which the requested data is stored. This algorithm orders requests according to the track location on the disk where the data is stored. The disk first services the request for data stored on the outermost track, and then proceeds to service requests for data stored on tracks that are ordered towards the innermost track. Therefore, the disk is initially traversed from outermost to innermost track. When the innermost track that contains requested data is reached, the direction is reversed so that the disk is traversed from innermost track to outermost track, like an elevator stopping at selected floors. A variant of SCAN is called CSCAN. In CSCAN, instead of reversing direction when the innermost track is reached, the arm will travel back to the outermost track and seek inward again.

A need exists for a method and system in a data processing system to dynamically schedule a plurality of requests that include real-time and non-real-time requests, where the non-real-time requests are scheduled until a real-time request becomes urgent. In application Ser. No. 09/148,181, filed Sep. 3, 1998, there is disclosed a system in which when a real-time request becomes urgent, the arm moves directly from its current location to the track location on the disk that contains the most urgent real-time request. The arm bypasses all requests, both real-time and non-real-time, that may be between the two locations. Thus, as real-time requests become urgent, the arm may tend to "jump around" servicing real-time requests on a most-urgent basis.

SUMMARY OF THE INVENTION

One object of the present invention is to provide an improved data processing system.

Another object of the present invention is to provide a method and system in a data processing system for dynamically scheduling the processing of a plurality of requests that include both real-time and non-real-time requests.

It is yet another object of the present invention to provide a method and system in a data processing system for dynamically scheduling the processing of a plurality of requests that processes urgent real-time requests in a timely manner, while minimizing back-and-forth movement of the disk arm.

The present invention provides a method and system in a data processing system for dynamically scheduling the processing of a plurality of requests to access a disk, in which each of the plurality of requests is associated with a location on the disk. The method of the present invention processes the requests in a first sequential order and determines the amount of time necessary to process a selected number of requests associated with locations between the current location on the disk and the most urgent request. At a time that is earlier than the deadline for processing the most urgent request by the amount of time necessary to process the selected number of requests, the method commences processing of the selected number of requests in a second sequential order.

The above as well as additional objectives, features, and advantages of the illustrative embodiment will become apparent in the following detailed written description.

BRIEF DESCRIPTION OF THE DRAWINGS

The novel features are set forth in the appended claims. The present invention itself, however, as well as a preferred mode of use, further objectives and advantages thereof, will best be understood by reference to the following detailed description of a preferred embodiment when read in conjunction with the accompanying drawings, wherein:

DETAILED DESCRIPTION OF A PREFERRED EMBODIMENT

A preferred embodiment of the present invention and its advantages are better understood by referring to FIGS. 1–5 of the drawings, like numerals being used for like and corresponding parts of the accompanying drawings.

The present invention defines two categories of real-time requests: hard real-time requests and soft real-time requests. These requests, along with non-real-time requests, are stored in a scan queue and processed sequentially in accordance with a SCAN or CSCAN algorithm until there is only enough time to process a selected number of requests before one of the real-time requests becomes urgent. The selected number of requests and the urgent request are then processed sequentially. The remaining requests are then processed sequentially from the location of the urgent real-time request.

All hard real-time requests are processed, even if they are past their associated deadlines. Soft real-time requests past their associated deadlines are discarded.

Real-time data may be classified into two categories: "hard real-time data" and "soft real-time data". Hard real-time data is data that must be transferred within a specified period of time. Failure to transfer any portion of hard real-time data before the deadline is catastrophic because critical data will be lost. Thus, the performance objective for the transfer of hard real-time data is to have no missed deadlines, and consequently, no lost data. An example of hard real-time data is aircraft flight system data.

Soft real-time data is data that should be transferred within a specified period of time, or deadline. Failure to transfer soft real-time data before the deadline results in lost data, where loss of some data is tolerable. The performance objective for the transfer of soft real,time data is to have a low percentage of missed deadlines, and consequently, a low percentage of lost data. An example of soft real-time data is packetized voice data.

Figure 1:
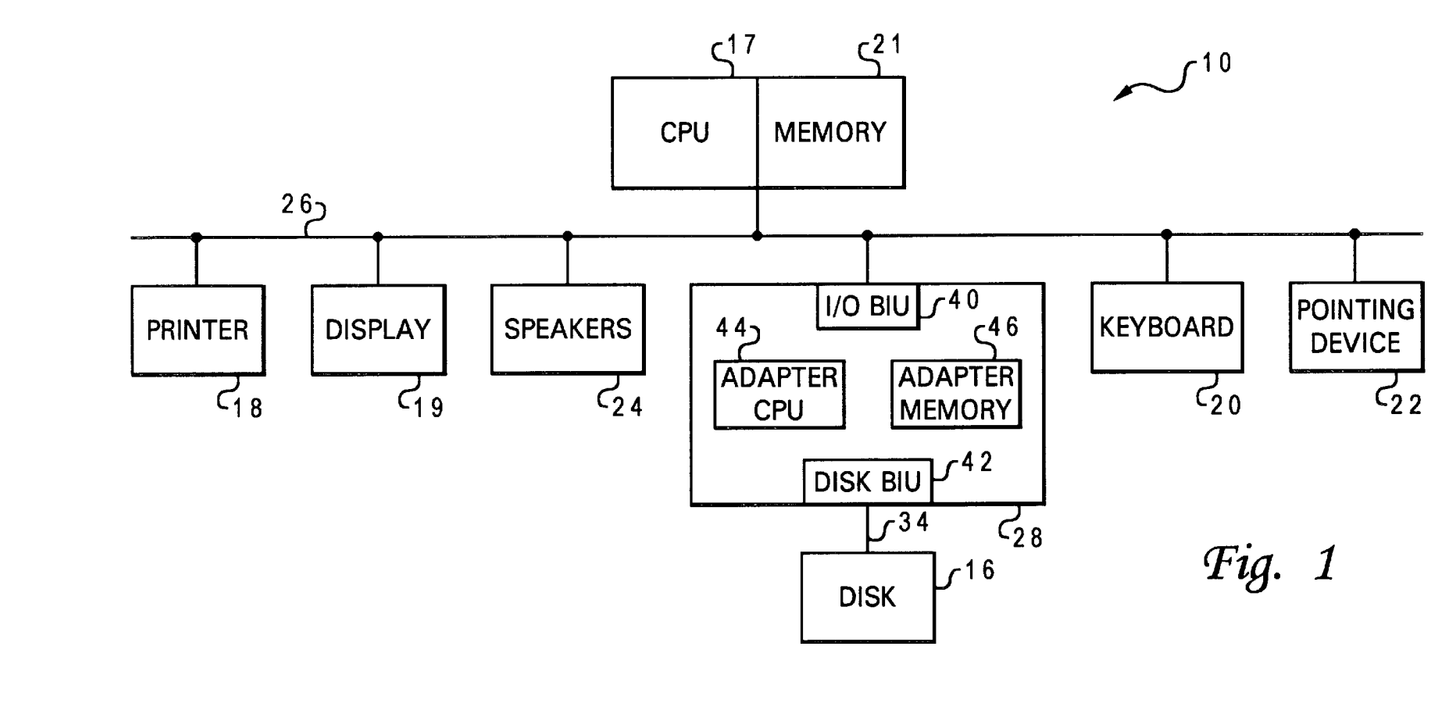
FIG. 1 is a high level block diagram of a data processing system which may be utilized to implement the method and system of the present invention.

FIG. 1 is a pictorial representation of a data processing system 10 which may be utilized to implement the method and system of the present invention. Data processing system 10 includes a disk 16 and a printer/output device 18. One or more disks may be utilized to store the various data objects or files which may be periodically accessed, processed, and presented within data processing system 10 in accordance with the method and system of the present invention.

Data processing system 10 may be implemented utilizing any suitably configured personal computer, mini computer, or mainframe computer. Data processing system 10 includes a CPU 17, memory 21, a computer display 19, keyboard 20, input pointing device 22, and speakers 24. Those skilled in the art will appreciate that input pointing device 22 may be implemented utilizing a pointing stick, a mouse, a track ball, or a pen.

The process described herein are supported by mechanisms within a disk adapter 28. Disk adapter 28 is coupled to CPU 17 by means of an I/O bus 26. In current systems, this bus is typically a PCI bus. Adapter 28 includes an I/O bus interface unit (BIU) 40. The I/O BIU 40 manages the protocol necessary for data and control information to be transmitted across I/O bus 26 between adapter 28 and CPU 17 and memory 21 to which adapter 28 is attached. In a similar fashion, disk adapter 28 attaches to disk 16 by means of a disk bus 34. In current systems bus 34 is typically a SCSI bus. Similarly, adapter 28 includes a disk BIU 42. Disk BIU 42 manages the protocol necessary for data and control information to be transmitted across disk bus 34 between adapter 28 and disk 16. Within adapter 28 there is a processing unit 44 and adapter memory 46. Processing unit 44 can be implemented as a state machine or as a programmable microprocessor. Processing unit 44 is capable of executing the algorithms specified herein, as well as accessing the data stored in adapter memory 46.

Adapter memory 46 can be implemented using Random Access Memory (RAM). Adapter processor 44 is capable of addressing locations within RAM 46, and can read and write data to adapter memory 46. Data and control information to or from the CPU 17 can be stored in adapter memory 46. Also contained within adapter memory 46 are a number of software data structures which are described below.

When adapter 28 is initially powered on, adapter 28 will perform a number of specific operations which include establishing a buffer pool space in adapter memory 46, establishing the scan queue data structure within adapter memory 46, and determining the geometry of the attached disk 16.

While data processing system 10 is in operation, adapter 28 will collect information that can be used in an effort to control the performance of adapter 28. This information is collected and stored in adapter memory 46. The information includes the number of times a hard real-time deadline was missed, the number of times soft real-time data were discarded due to a missed deadline, and the number of requests that have been serviced.

When adapter 28 is in operation, the information collected will be periodically checked by CPU 17. Depending on the values collected, CPU 17 will control the flow of data through adapter 28.

Adapter memory 46 represents a collection of addressable storage locations within adapter 28. Adapter memory 46 is separate from and independent of memory 21.

A number of logical data structures are contained within memory 46 of adapter 28:

(1) A scan queue: A specialized version of a doubly linked list data structure, for the purpose of ordering the outstanding requests to the disk. Scan queue includes a plurality of scan elements, which will be discussed in connection with FIG. 2.

(2) A buffer pool: A pool of storage locations where the I/O control blocks received from CPU 17 are stored.

Figure 3:
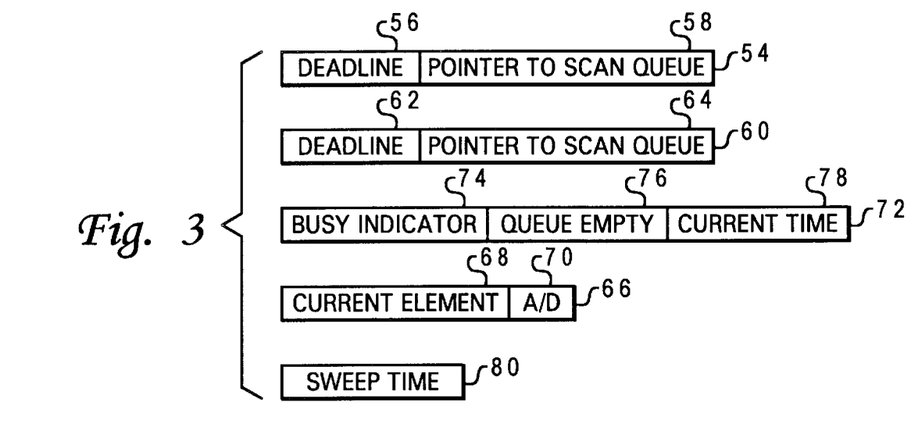
FIG. 3 is a pictorial representation of the set of control buffers according to the present invention.

(3) A set of five control buffers, the structure of which is shown in FIG. 3:

(A) Most urgent hard real-time request buffer 54: This buffer includes two fields. The first field 56 includes the time, also called a deadline, by which the most urgent hard real-time request must be serviced. The second field 58 includes a pointer to the location in the scan queue that contains the most urgent hard real-time request. When there are no hard real-time requests in the scan queue, the value in field 58 is set to the NULL value.

(B) Most urgent soft real-time request buffer 60: This buffer includes two fields. The first field 62 includes the time, i.e. deadline, by which the most urgent soft real-time request must be serviced. The second field 64 includes a pointer to the location in the scan queue that includes the most urgent soft real-time request. In the event there are no soft real-time requests in the scan queue, the value in field 64 is set to the NULL value.

(C) Current scan track pointer 66: The scan track pointer buffer includes two fields. The first field 68 includes a pointer to the element in the scan queue that is currently scheduled to be served next by disk 16. The second field 70 includes an indicator as to the direction in the scan queue to select the next element. This indicator can specify either ascending or descending track numbers.

(D) Status register 72: The status register includes three fields which are pertinent to the operation of the present invention. The first field 74 includes a disk busy indicator. This indicator is set when the disk is busy serving a request and no further requests can be dispatched to it. This indicator is reset when the disk can receive another request. The second field 76 contains a scan queue empty indicator. This indicator is set when there are one or more elements in the scan queue. It is reset when there are no elements in the scan queue. The third field 78 includes the current clock value. This is an encoding of the current time. The encoding is consistent with the time encoding included within the requests.

(E) Sweep time buffer 80: The sweep time buffer contains the time at which a sweep according to the present invention must commence. Generally, the sweep time is a time earlier than the deadline for the most urgent real-time request by the amount of time required to service the number of real-time requests, and non-real time requests located on the same track as a real-time request, between the current location of the arm on the disk and the most urgent real-time request.

The scan queue is a doubly linked list. The request which is to be serviced next by disk 16 is selected by traversing the scan queue. Also, when either the most urgent hard real-time request or the most urgent soft real-time request must be immediately serviced, the current pointer can be directly updated and the scan can effectively continue at the location of the most urgent real-time request without the need for reordering scan queue.

Figure 2:
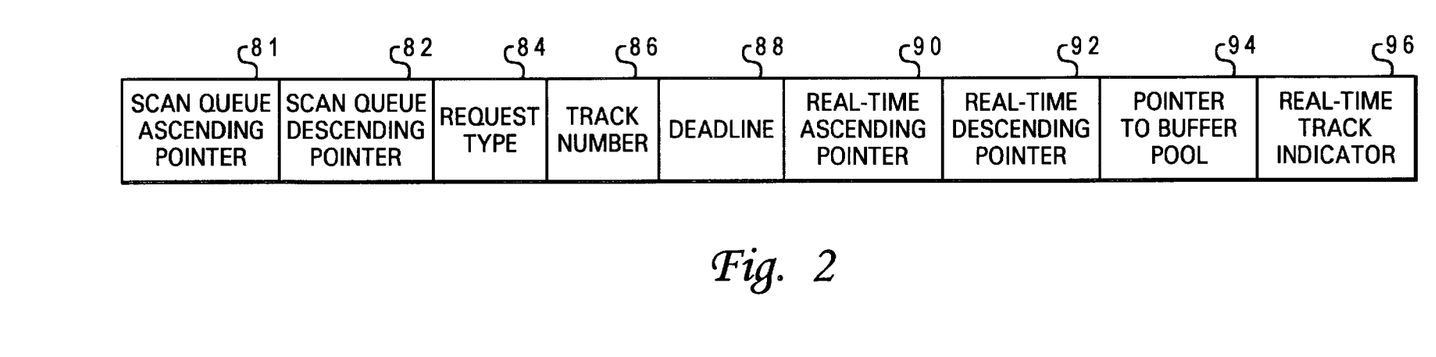
FIG. 2 is a pictorial representation of scan queue elements and the associated fields included within each element in accordance with the method and system of the present invention.

The elements of the scan queue have the structure as depicted in FIG. 2. In a manner consistent with the concept of a doubly linked list, a scan queue ascending pointer 81 points to the element of the scan queue which would have the next higher track number. Similarly, a scan queue descending pointer 82 points to the element of the scan queue which would have the next lower track number. When the value. in scan queue ascending pointer 81 is set to NULL, this indicates that this element is the last element in the scan queue, i.e. the element with the highest track number. Similarly, when the value in scan queue descending pointer 82 is set to NULL, this indicates that this element is the first element in the scan queue, i.e. the element with the lowest track number. When scan queue ascending pointer 81 and scan queue descending pointer 82 of a element are both NULL, the element is the only element in the scan queue.

A request type 84 indicates the type of service request. The request types are hard real-time, soft real-time, and non-real-time.

A track number 86 includes the track number on disk 16 that contains the requested data. The track number is used to determine where in the scan queue the request is to be placed.

A deadline 88 is used to indicate when the element in the scan queue must be serviced. The deadline only has relevance if the request is real-time.

A real-time ascending pointer 90 and a real-time descending pointer 92 are used to effectively "chain together" the real-time requests. Just as the scan queue is a doubly linked list, which indicates the order by which requests are to be serviced by disk 16, real-time ascending pointer 90 and real-time descending pointer 92 are used to order the real-time requests within the scan queue by their urgency. For hard real-time elements in the scan queue, their ascending real-time pointer 90 points to the next less urgent hard real-time request in the scan queue. Descending real-time pointer 92 points to the next most urgent hard real-time request in the scan queue.

Similarly, for soft real-time elements, ascending real-time pointer 90 points to the next less urgent soft real-time request in the scan queue and descending real-time pointer 92 points to the next most urgent soft real-time request in the scan queue. In both cases, for the most urgent real-time requests in the scan queue, setting ascending pointer 90 of a hard real-time element to NULL indicates that this element is the least urgent hard real-time request currently in the scan queue. Similarly, setting descending pointer 92 of a hard real-time element is set to NULL indicates that this element is currently the most urgent hard real-time element currently in the scan queue. This principle is the same for the soft real-time requests currently in the scan queue. For non-real-time requests, real-time ascending 90 and descending 92 pointers are set to NULL.

The pointer to buffer pool 94 points to the location in the buffer pool where host computer I/O command block data associated with the current request is placed.

A real-time track indicator 96 is set whenever the element is a real-time request, or a non-real-time request is on the same track as a real-time request. The real-time track indicator is used to identify the requests that must be serviced in a sweep.

The manner by which requests are placed into the scan queue is now described. When an application program running on CPU 17 and accessing memory 21 wishes to access disk 16, whether to write data to or read data from disk 16, the application will construct an I/O command request block. The I/O command request block will include specifications for the following data which are significant to the operation of the present invention: type of request, deadline, and logical block address. The deadline is an encoding of the time by which the request must be serviced. The logical block address is translated by adapter 28 to indicate the disk track number which is used by the present invention.

The I/O command request block will be placed into adapter memory 46 where it will be processed. From the information included within the request block, one or more scan queue elements will be constructed. The I/O command request block data will be stored in the adapter buffer pool. The location in the buffer pool where it is stored is in pointer to buffer pool 94 in the scan queue element.

FIG. 4 is a high level flow chart illustrating the creation of a scan queue element and the insertion of the element into the scan queue in according with the method and system of the present invention. When an element to be inserted is received, the adapter checks, at decision block 402, if the scan queue is empty and the disk is idle., If so, the adapter forwards the request directly to the disk, at block 404, and processing ends. If, at decision block 402, the disk is not idle and the scan queue is not empty, the adapter checks the type of request received, at block 406. The adapter determines, at decision block 408 if the request is a real-time request or a non-real-time request. If the request is a non-real-time request, the adapter determines, at decision block 410, if a real-time request is on the track associated with the current request. If so, the adapter sets the real-time track indicator for the new element, at block 412, and inserts the new element into the scan queue, at block 414. If, at decision block 410, there is not a real-time request on the track associated with the current element, the adapter inserts the element into the scan queue at block 414. Then, the adapter determines if the track associated with the new element is between the current location of the disk arm and the most urgent real-time request and the real-time track indicator is set for the element, at decision block 416. If so, the adapter updates the sweep buffer by the amount of time necessary to service one more disk request, at block 418, and processing ends. If, at decision block 416, the track associated with the current element is not between the current location of the disk arm and the most urgent real-time request, or the real-time track indicator is not set, then processing ends.

Figure 4A:
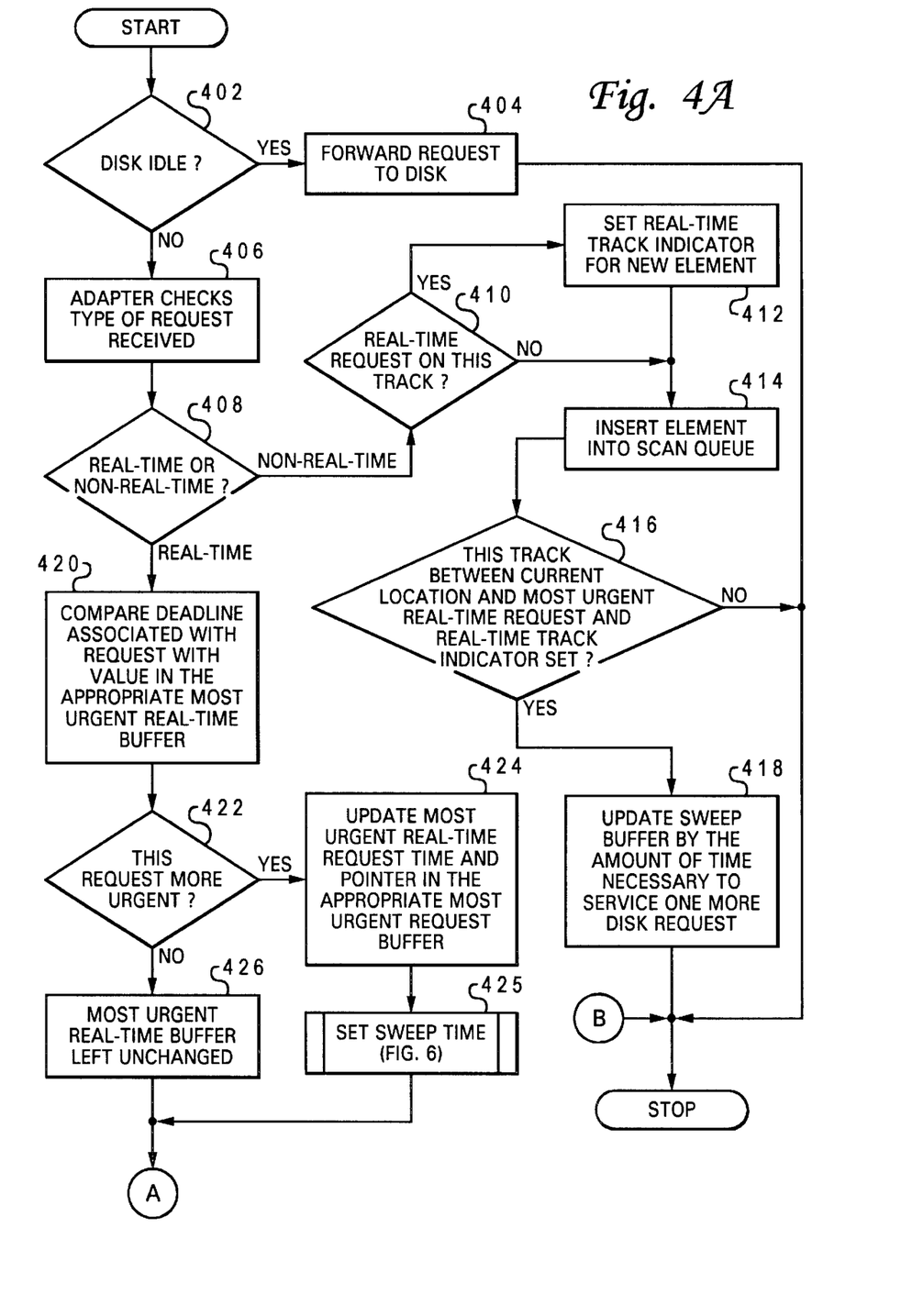
FIG. 4 is a high level flow chart which depicts the creation of a scan queue element and the insertion of the element into the scan queue in accordance with the method and system of the present invention; and, FIG. 5 is a high level flow chart which illustrates the removal of scan queue elements from the scan queue in accordance with the method and system of the present invention.

Referring again to decision block 408, if the request is a real-time request, then the adapter compares the deadline associated with the request with the value in the appropriate most urgent real-time buffer at block 420. More specifically, if the real-time request is a hard real-time request, then the adapter compares the deadline for the request being placed in the scan queue with the deadline in the most urgent hard real-time request buffer. If the current request is a soft real-time request, then the adapter compares the deadline for the request with the deadline in the most urgent soft real-time buffer. If, at decision block 422, the current request is more urgent, the adapter updates the most urgent real-time request time and pointer in the appropriate most urgent request buffer, at block 424, and sets the sweep time, as indicated generally at block 425 and shown in detail with respect to FIG. 6. If, at decision block 422, the current request is not more urgent, then the adapter leaves the most urgent real-time buffer unchanged, as indicated at block 426. Then, referring to FIG. 4B, the adapter determines, at decision block 430, if either there is no element on the track associated with the current element or another real-time request on that track. If so, the adapter sets the real-time track indicator, at block 432, and inserts the current element into the scan queue, at block 434. Then, the adapter determines if the track associated with the current element is between the current arm location and the most urgent real-time request, at decision block 436. If so, the adapter updates the sweep buffer by the amount of time necessary to service one more disk request, at block 438, and processing ends.

Figure 4B:
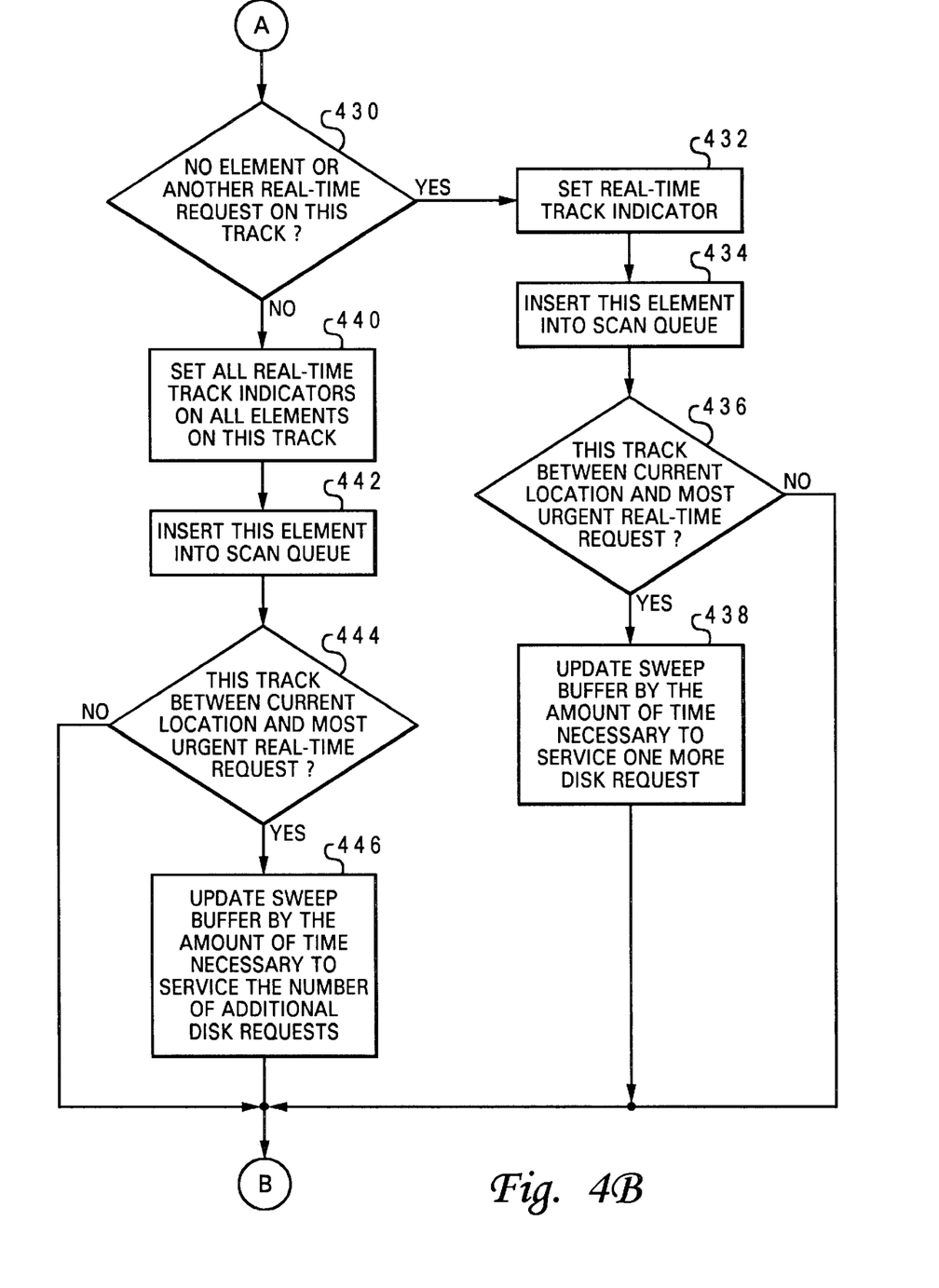

Referring again to decision block 430 of FIG. 4B, if there are other non-real-time requests but not real-time requests on the track associated with the current request, then the adapter sets all real-time track indicators on all elements of the track, at block 440, and inserts the current element into the scan queue, at block 442. Then, the adapter determines if the track associated with the current request is between the current arm location and the most urgent real-time request, at decision block 444. If so, the adapter updates the sweep buffer by the amount of time necessary to service the number of additional disk requests, at block 446, and processing ends.

Figure 6:
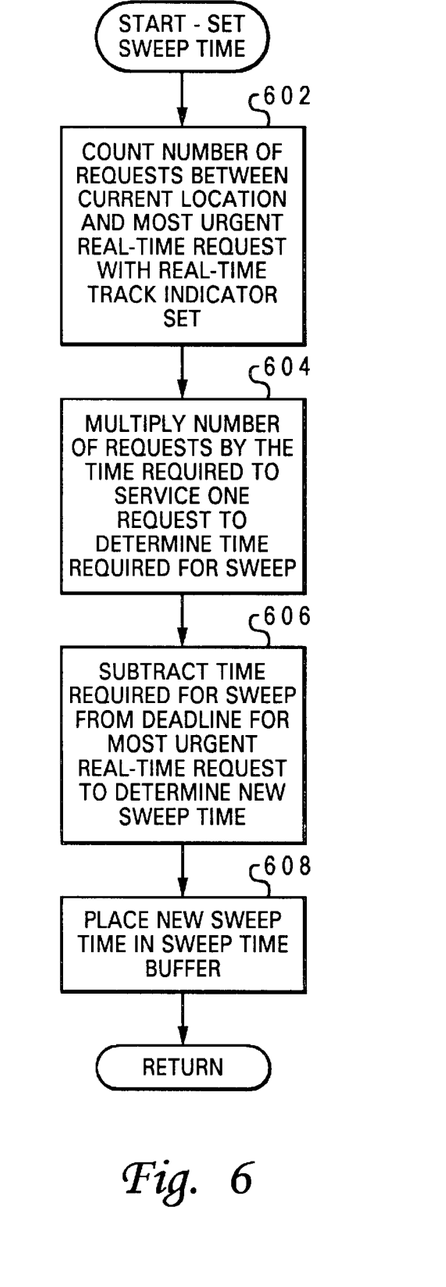
FIG. 6 is a flow chart illustrating the setting of the sweep time according to the present invention.

Referring now to FIG. 6, there is shown a flow chart of the routine for setting the sweep time according to the present invention. The adapter counts the number of requests between the current location (i.e. the current disk track being serviced) and the most urgent real-time request with their real-time track indicators set, at block 602, thereby determining the number of requests that must be serviced on a sweep. Then, at block 604, the adapter multiplies the number of requests determined at block 602 by the time required to service one request, thereby determining the time required for the sweep. Then, the adapter subtracts the time required for the sweep from the deadline for the most urgent real-time request, at block 606, thereby to determine the new sweep time. Then, the adapter places the new sweep time in the sweep time buffer at block 608 and processing returns.

FIG. 5 is a high-level flow chart illustrating the removal of requests from the scan queue in accordance with the method and system of the present invention. On each iteration of FIG. 5 processing, the adapter tests, decision block 502, if the scan queue is empty. If so, processing ends. If the scan queue is not empty, then the adapter checks the current time in the status register, at block 504. If, at decision block 506, the current time is earlier than the sweep time, then the adapter determines, at decision block 508, if there are any outstanding hard real-time requests. If so, the adapter determines, at decision block 509, if the most urgent hard real-time request is at or past its deadline. If not, the adapter, determines at decision block 510, if there are any outstanding soft real-time requests. If so, the adapter determines at decision block 511, if the most urgent real-time request is at or past its deadline. If not, the adapter selects the next sequential request for processing, at block 512.

During processing, the adapter determines, at decision block 514, if the current request is the most urgent real-time request. If so, the adapter updates the appropriate buffers and updates the scan queue;, at block 516. Then, the adapter determines, at decision block 518, if the scan direction is ascending and the current ascending pointer is NULL. If so, the adapter changes the direction indicator to descending and selects the next element using the descending pointer, at block 520. Then, the adapter determines, at decision block 522, if the scan direction is descending and the current descending pointer is NULL. If so, the adapter changes the direction indicator to ascending and selects the next element using the ascending pointer, at block 524. Then, the adapter updates the appropriate pointers, removes the element from the scan queue, and sets the disk indicator to busy, at block 526. If, at decision block 528, the real-time indicator is set for the current element, the adapter updates the sweep time by adding the time necessary to process one more request to the sweep time buffer, at block 530. The adapter then issues a request to the disk, at block 532, and processing ends.

FIG. 5 processing continues normally until a most urgent real-time request is at or past its deadline or until the current time is equal to or later than the sweep time. If, at decision block 509, a most urgent real-time request is at or past its deadline, then processing continues at block 534 (shown in FIG. 5C). As indicated at block 534,.the adapter uses the pointer in the most urgent hard real-time buffer to go to this element in, the scan queue, which is the most urgent hard real-time request. Then, the adapter removes the element from the scan queue, at block 536, and updates the scan pointer to this element, at block 538. As indicated at block 540, the adapter uses the real: time pointer in the scan queue element to find the next most urgent real-time request and updates the most urgent hard real-time buffer. The adapter then resets the sweep time, as indicated at block 542, and shown in detail in Figure 6. The adapter sets the disk status indicator to busy, at block 544, and processing returns to block 532 of FIG. 5A.

Figure 5A:
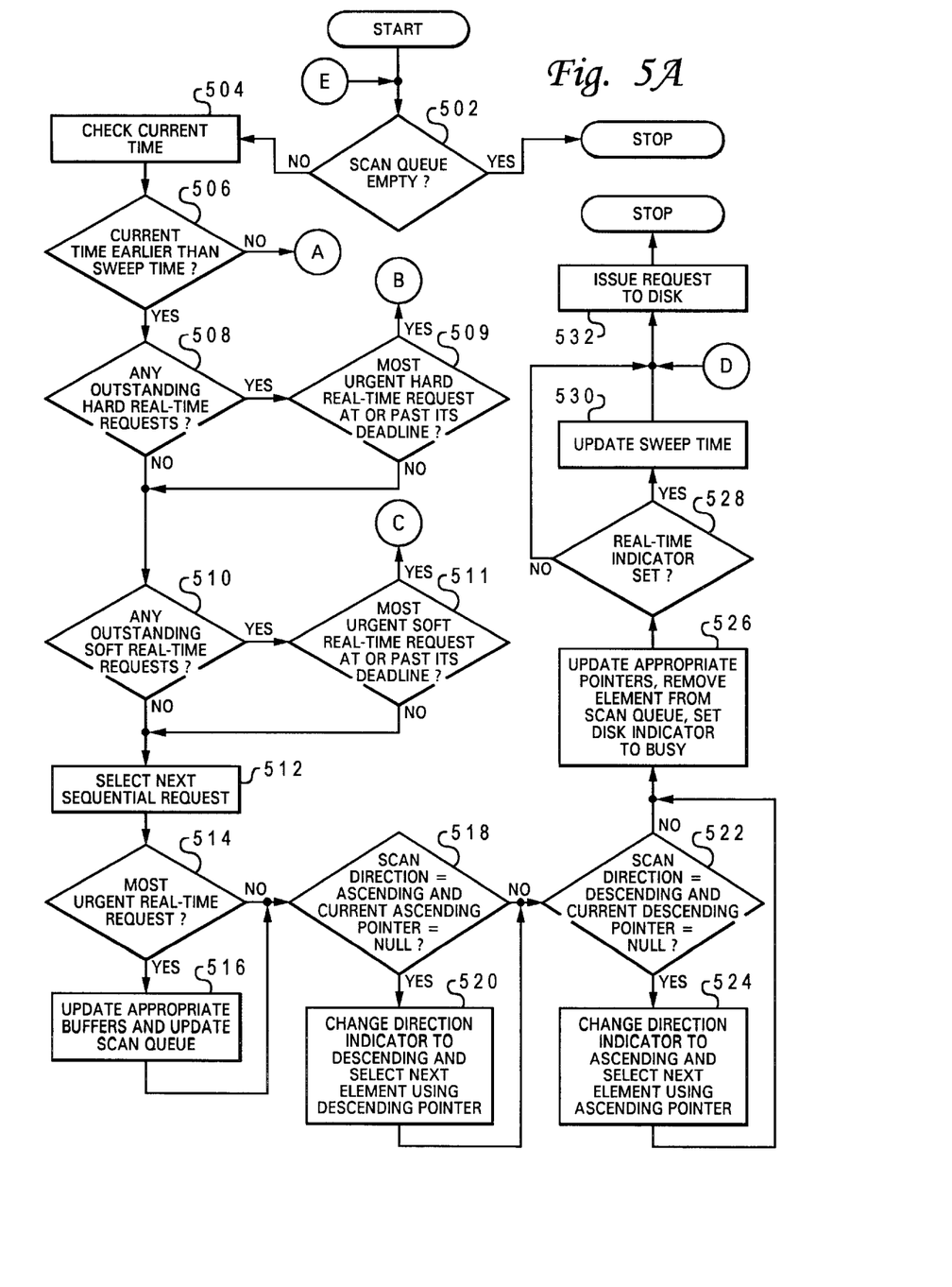
Figure 5B:
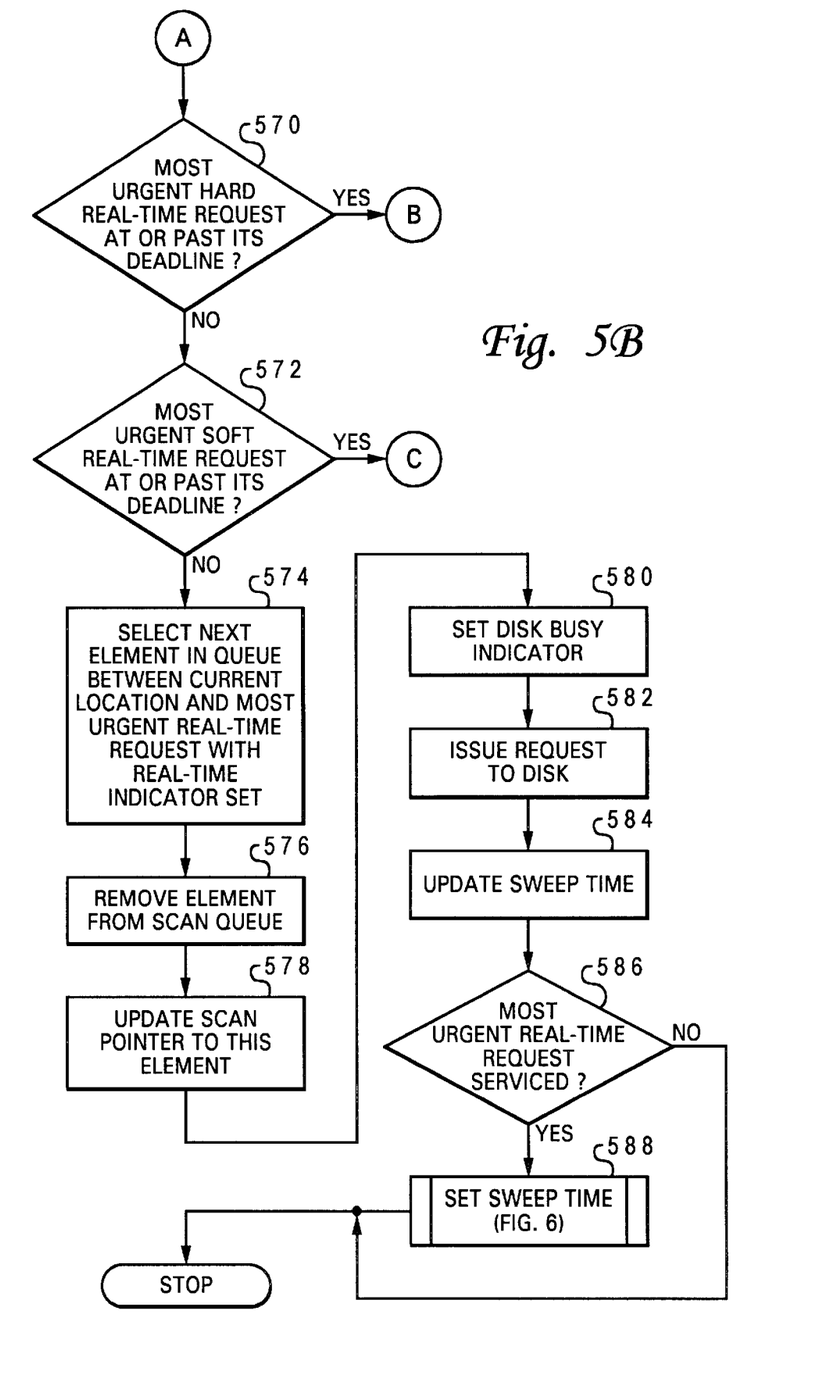
Figure 5C:
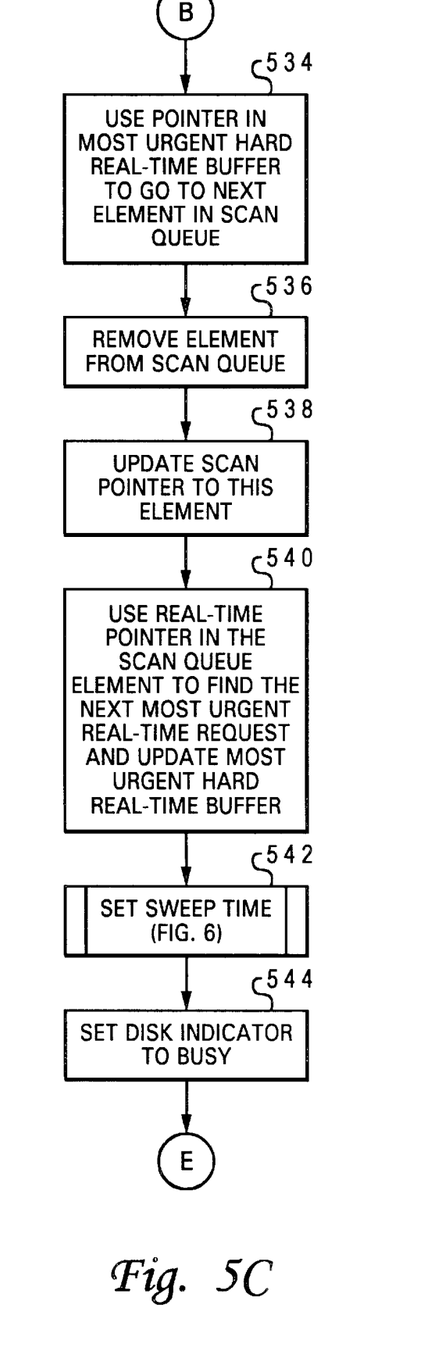
Figure 5D:
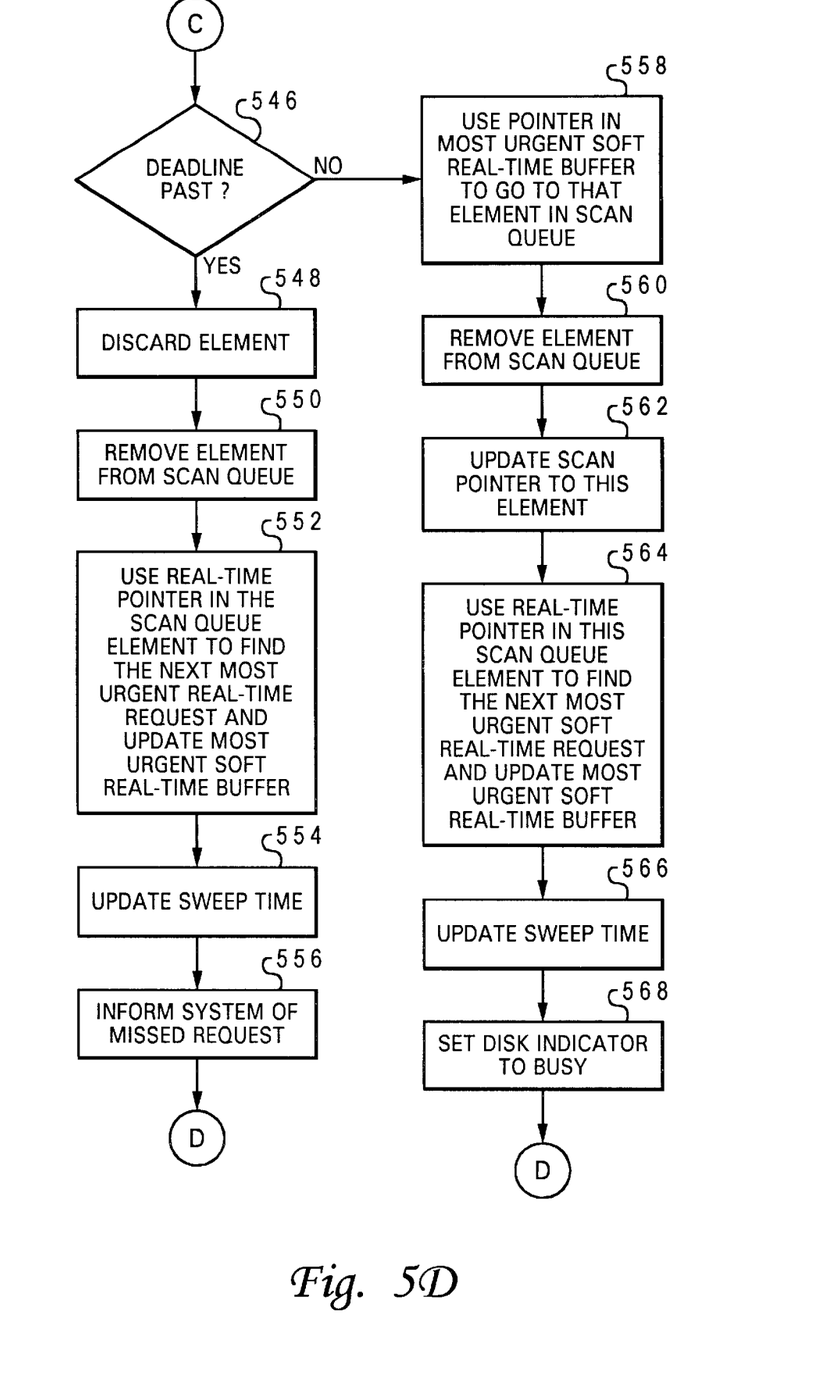

Referring again to FIG. 5A, if, at decision block 511, the most urgent oft real-time request is at or past its deadline, processing proceeds to FIG. 5D. The adapter determines, at decision block 546, if the deadline for processing the request is past. If so, the adapter discards the element, at block 548, and removes the element from the scan queue, at block 550. Then, the adapter uses the real-time pointer in the scan queue element to find the next most urgent real-time request and updates the most urgent soft real-time buffer, at block 552. Then, the adapter updates the sweep time, at block 554, by subtracting the time necessary to service one more request from the sweep time in the sweep time buffer. The adapter informs the system of the missed request, at block 556, and processing returns to decision block 502 of FIG. 5A.

Referring still to FIG. 5B, if, at decision block 546, the deadline for processing the most urgent soft real-time request is not past its deadline, the adapter uses the pointer in the most urgent soft real-time buffer to go to that element in the scan queue at block 558, and removes the element from the scan queue at block 560. The adapter updates the scan pointer to this element, at block 562, and uses the real-time pointer in this scan queue element to find the next most urgent soft real-time request and updates the most urgent soft real-time buffer, at decision block 564. Again, the adapter updates the sweep time in the sweep time buffer, at block 566, sets the disk indicator to busy, at block 568, and processing returns to block 532 of FIG. 5A.

Referring again to FIG. 5A, if, at decision block 506, the current time is not earlier than the sweep time, which indicates that there is only enough time to process the request for which the real-time track indicator is set before a real-time request becomes urgent, processing continues at FIG. 5B.

Referring to FIG. 5B, the adapter tests, at decision block 570, if the most urgent hard real-time request is at or past its deadline. If so, processing proceeds to FIG. 5C. If not, the adapter determines, at decision block 572, if the most urgent soft real-time request is at or past its deadline. If so, processing proceeds to FIG. 5D. If not, the adapter selects the next element in the queue between the current location and the most urgent real-time request that has a real-time indicator set, at block 574. The adapter removes that element from the scan queue, at block 576, and updates the scan pointer to this element, at block 578. The adapter then sets the disk busy indicator, at block 580, issues a request to the disk, at block 582, and updates the sweep time at block 584. The adapter then determines, at decision block 586, if the most urgent real-time request has been serviced. If not, processing ends. After the most urgent real-time request has been serviced, as indicated at decision block 586, the adapter sets the sweep time, as indicated generally at block 588 and shown in detail with respect to FIG. 6.

While an illustrative embodiment has been particularly shown and described, it will be understood by those skilled in the art that various changes in form and detail may be made therein without departing from the spirit and scope of the illustrative embodiment.

What is claimed is:

1. A method in a data processing system of dynamically scheduling the processing of a plurality of requests to access a disk, each of said plurality of requests being associated with a location on said disk, said method comprising the steps of:
   processing said requests in a first sequential order;
   determining an amount of time necessary to process a selected number of requests associated with locations between a current location on said disk and a most urgent request, said most urgent request having a deadline; and,
   commencing, at a time earlier than said deadline by said amount of time necessary to process said number of requests, processing of said selected number of requests in a second sequential order.

2. The method as claimed in claim 1, wherein said requests include real-time requests and non-real-time requests.

3. The method as claimed in claim 2, wherein said most urgent request is a real-time request.

4. The method as claimed in claim 2, wherein said selected number of requests are selected from real-time requests.

5. The method as claimed in claim 2, wherein said selected number of requests are selected real-time requests, and non-real-time requests associated with a location on said disk associated with a real-time request.

6. The method as claimed in claim 1, including the step of processing said most urgent request at or before said deadline.

7. The method as claimed in claim 2, including the step of: storing said requests in a scan queue.

8. The method as claimed in claim 7, including the step setting a real-time track indicator for each real-time request in said scan queue.

9. The method as claimed in claim 8, including the step of setting said real-time track indicator for each non-real-time request in said scan queue that is located a track of said disk occupied by a real-time request.

10. The method as claimed in claim 9, wherein said selected requests are selected from the requests for which said real-time track indicator is set.

11. The method as claimed in claim 9, wherein said amount of time is determined according to the number of requests between said current location and said most urgent request and for which said real-time indicator is set.

12. The method as claimed in claim 8, wherein said selected requests are selected from the requests for which said real-time indicator is set.

13. The method as claimed in claim 8, wherein said amount of time is determined according to the number of requests between said current location and said most urgent request and for which said real-time indicator is set.

14. The method as claimed in claim 8, including the step of updating said amount of time whenever a request for which said real-time indicator is set is processed.

15. A data processing system for dynamically scheduling the processing of a plurality of requests to access a disk, each of said plurality of requests being associated with a location on said disk, said method comprising the steps of:
   means for processing said requests in a first sequential order;
   means for determining an amount of time necessary to process a selected number of requests associated with locations between a current location on said disk and a most urgent request, said most urgent request having a deadline; and,
   means for commencing, at a time earlier than said deadline by said amount of time necessary to process said number of requests, processing of said selected number of requests in a second sequential order.

16. The system as claimed in claim 15, wherein said requests include real-time requests and non-real-time requests.

17. The system as claimed in claim 16, wherein said most urgent request is a real-time request.

18. The system as claimed in claim 16, wherein said selected number of requests are selected from real-time requests.

19. The system as claimed in claim 16, wherein said selected number of requests are selected real-time requests, and non-real-time requests associated with a location on said disk associated with a real-time request.

20. The system as claimed in claim 15, including:,
   means for processing said most urgent request at or before said deadline.

21. The system as claimed in claim 16, including:
means for storing said requests in a scan queue.

22. The system as claimed in claim 21, including:,
means for setting a real-time track indicator for each real-time request in said scan queue.

23. The system as claimed in claim 22, including:
means for setting said real-time track indicator for each non-real-time request in said scan queue that is located a track of said disk occupied by a real-time request.

24. The system as claimed in claim 23, wherein said selected requests are selected from the requests for which said real-time track indicator is set.

25. The system as claimed in claim 23, wherein said amount of time is determined according to the number of requests between said current location and said most urgent request and for which said real-time indicator is set.

26. The system as claimed in claim 22, wherein said selected requests are selected from the requests for which said real-time indicator is set.

27. The system as claimed in claim 22, wherein said amount of time is determined according to the number of requests between said current location and said most urgent request and for which said re al-time indicator is set.

28. The system as claimed in claim 22, including: means for updating said amount of time whenever a request for which said real-time indicator is set is processed.

* * * * *